United States Patent
Jain et al.

(10) Patent No.: US 10,749,673 B2
(45) Date of Patent: Aug. 18, 2020

(54) METHODS FOR MINIMIZING SIDE CHANNEL LEAKAGE FOR GROUP KEY AGREEMENT FOR CONTROLLER AREA NETWORK

(71) Applicant: Robert Bosch GmbH, Stuttgart (DE)

(72) Inventors: Shalabh Jain, Pittsburgh, PA (US); Jorge Guajardo Merchan, Pittsburgh, PA (US); Samarjit Das, Sewickley, PA (US)

(73) Assignee: Robert Bosch GmbH, Stuttgart (DE)

( * ) Notice: Subject to any disclaimer, the term of this patent is extended or adjusted under 35 U.S.C. 154(b) by 273 days.

(21) Appl. No.: 15/916,051

(22) Filed: Mar. 8, 2018

(65) Prior Publication Data
US 2018/0262327 A1    Sep. 13, 2018

Related U.S. Application Data

(60) Provisional application No. 62/468,691, filed on Mar. 8, 2017.

(51) Int. Cl.
*H04L 9/08* (2006.01)
*H04L 12/40* (2006.01)
(Continued)

(52) U.S. Cl.
CPC .............. *H04L 9/088* (2013.01); *G06N 7/005* (2013.01); *G06N 20/00* (2019.01); *G06N 20/20* (2019.01);
(Continued)

(58) Field of Classification Search
CPC ........ G06N 7/005; G06N 20/00; G06N 20/20; H04L 9/002–005; H04L 9/08–0833;
(Continued)

(56) References Cited

U.S. PATENT DOCUMENTS

2015/0089236 A1    3/2015  Han et al.
2016/0315766 A1    10/2016 Ujiie et al.
(Continued)

OTHER PUBLICATIONS

International Search Report and Written Opinion corresponding to International Application No. PCT/US2018/021604, dated Jun. 22, 2018 (8 pages).
(Continued)

*Primary Examiner* — Kevin Bechtel
(74) *Attorney, Agent, or Firm* — Maginot, Moore & Beck LLP

(57) ABSTRACT

A method for operation of a communication network reduces leakage of data to an adversary that can observe signals transmitted through the communication network. The method includes generating a ranking to order operation of a plurality of nodes that exchange data in a group cryptographic key exchange process based on a leakage map of the nodes. The ranking minimizes leakage of data through a shared communication medium during the group cryptographic key exchange process. The method includes transmitting the ranking to the plurality of nodes through the shared communication medium, and performing, with the plurality of nodes, the group cryptographic key exchange process in an order of operation specified in the ranking to enable the plurality of nodes to exchange a shared cryptographic key through the shared communication medium while minimizing leakage of data.

8 Claims, 6 Drawing Sheets

(51) Int. Cl.
  *H04L 12/66* (2006.01)
  *G06N 20/00* (2019.01)
  *H04L 9/12* (2006.01)
  *G06N 20/20* (2019.01)
  *G06N 7/00* (2006.01)
  *H04L 9/00* (2006.01)

(52) U.S. Cl.
  CPC ............ *H04L 9/003* (2013.01); *H04L 9/0833* (2013.01); *H04L 9/12* (2013.01); *H04L 12/40013* (2013.01); *H04L 12/66* (2013.01)

(58) Field of Classification Search
  CPC ......... H04L 9/0861–0877; H04L 9/088; H04L 9/12; H04L 12/40013; H04L 12/66
  See application file for complete search history.

(56) References Cited

U.S. PATENT DOCUMENTS

| | | | |
|---|---|---|---|
| 2016/0330032 | A1 | 11/2016 | Naim et al. |
| 2016/0342531 | A1 | 11/2016 | Sharma |
| 2017/0019251 | A1 | 1/2017 | Jain et al. |
| 2018/0262527 | A1* | 9/2018 | Jain ..................... H04L 63/1475 |
| 2018/0316495 | A1* | 11/2018 | Wall ...................... H04L 9/0836 |
| 2019/0197471 | A1* | 6/2019 | Endo ..................... H04L 9/0819 |

OTHER PUBLICATIONS

Aciiçmez, Onur et al., "Predicting Secret Keys via Branch Prediction," Springer Berlin Heidelberg, LNCS 4377, pp. 225-242, 2007 (18 pages).
Bernstein, Daniel J., "Cache-timing Attacks on AES," Apr. 2005 (37 pages).
Brumley, David et al., "Remote Timing Attacks are Practical," Proceedings of the 12th Conference on USENIX Security Symposium vol. 12, SSYM'03. USENIX Association, 2003.
Jain, Shalabh et al., "Physical Layer for Group Key Agreement for Automotive Controller Area Networks," In Proc. of Cryptographic Hardware and Embedded Systems (CHES 2016). Springer Berlin Heidelberg, 2016 (20 pages).
Kocher, Paul et al., "Differential Power Analysis," CRYPTO'99, LNCS 1666, pp. 388-397, 1999 (10 pages).
Kocher, Paul C., Timing Attacks on Implementations if Diffie-Hellman, RSA, DSS, and Other Systems, CRYPT0 96, LNCS 1109, pp. 104-113, 1996 (10 pages).
Microchip, Datasheet MCP2551, Technical Report, Microchip, retrieved from Internet: http://ww1.microchip.com/downloads/en/DeviceDoc/20001667G.pdf, accessed Nov. 11, 2016 (26 pages).
Müller, Andreas et al., "Plug-and-Secure Communication for CAN," CAN Newsletter, pp. 10-14, Dec. 2015 (5 pages).
Murvay, P.S. et al., "Source Identification Using Signal Characteristics in Controller Area Networks," IEEE Signal Processing Letters, vol. 21, Issue 4, pp. 395-399, Apr. 2014 (5 pages).
Cortes, C. et al., "Support-Vector Networks," Machine Learning, vol. 20, No. 3, pp. 273-297, 1995 (25 pages).
Hochreiter, Sepp et al., "Long Short-Term Memory," Neural Computation, vol. 9, No. 8, 1997 (32 pages).
Krizhevsky, Alex et al., "ImageNet Classification with Deep Convolutional Neural Networks," Neural Information Processing Systems, 2012 (9 pages).
Kruskal, Joseph B., "On the Shortest Spanning Subtree of a Graph and the Traveling Salesman Problem," Proceedings of the American Mathematical Society, vol. 7, No. 1, pp. 48-50, 1956 (3 pages).
Pettie, Seth et al., "An Optimal Minimum Spanning Tree Algorithm," Journal of the ACM, vol. 49, No. 1, 2002, pp. 16-34 (19 pages).
Prim, R.C., "Shortest Connection Networks and Some Generalizations," The Bell System Technical Journal, vol. 36, No. 6, pp. 1389-1401, 1957 (13 pages).
Sak, H. et al., "Long Short-Term Memory Recurrent Neural Network Architectures for Large Scale Acoustic Modeling," In Proceedings of Interspeech, pp. 338-342, 2014 (5 pages).
Simonyan, K. et al., "Very Deep Convolutional Networks for Large-Scale Image Recognition," Cornell University Library, submitted Sep. 2014, updated Apr. 2015, arXiv:1409.1556v6, retrieved from internet: https://arxiv.org/abs/1409.1556 (14 pages).

\* cited by examiner

METHODS FOR MINIMIZING SIDE CHANNEL LEAKAGE FOR GROUP KEY AGREEMENT FOR CONTROLLER AREA NETWORK

CLAIM OF PRIORITY

This application claims the benefit of U.S. Provisional Application No. 62/468,691, which is entitled "Methods for Minimizing Side channel Leakage for Group Key Agreement for Controller Area Network," and was filed on Mar. 8, 2017, the entire contents of which are expressly incorporated herein by reference.

CROSS REFERENCE

This application cross-references U.S. Provisional Application No. 62/468,669, U.S. Provisional Application No. 62/468,680, and U.S. Provisional Application No. 62/468,705, each of which was filed on Mar. 8, 2017. The entire contents of each of the cross-referenced applications are expressly incorporated herein by reference.

FIELD

This disclosure relates generally to the field of network communications and, more specifically, to systems and methods for secure communication using shared communication media.

BACKGROUND

The Controller Area Network (CAN) bus communications standard provides a robust communication interface that is used in a wide range of applications including, but not limited to, automobiles and other transportation vehicles, building automation, industrial systems, robotics, and other fields that require communication between embedded digital devices using a shared communication medium. Many CAN bus embodiments employ two electrically conductive wires, which are referred to as CAN-High (CANH) and CAN-Low (CANL), and electronic devices, which are referred to as "nodes" use the CANH and CANL wires as a shared communication medium to transmit and receive data using a standardized data frame format. The CAN bus typically utilizes of a pair of shielded or unshielded twisted pair of cables as the physical medium for signal transmission.

During normal operation, the nodes perform a bus arbitration process when one or more nodes wish to transmit a data frame to ensure that only one node actually transmits data on the CAN-High and CAN-Low lines at a time to provide reliable communication without "collisions" that occur when two or more nodes transmit simultaneously. In the CAN bus standard, when transmitting the dominant bit '0' on the bus, the output pins CANH and CANL are driven to different voltage levels, and the difference from CANH to CANL is the output of the CAN bus. Similarly, transmission of a recessive bit '1' occurs when CANH and CANL are not driven to higher relative voltage levels and will have similar voltage levels. Because the CAN bus is a shared communication medium, every node that is connected to a CAN bus can read each bit of data that is transmitted through the bus. This property of CAN bus presents problems when two nodes wish to communicate data privately that cannot be understood by other nodes that are connected to the bus.

Recent advancements to CAN bus implementations include configurations in which two nodes that are connected to the CAN bus transmit bits of data simultaneously (to produce a collision intentionally) to exchange cryptographic key data in a manner that prevents third party nodes from being able to determine which of the two transmitting nodes is actually transmitting information that forms a part of the cryptographic key. In one part of these key exchange techniques, two nodes simultaneously transmit a logical 1 and a logical 0 signal, followed by simultaneous transmission of the logical complement of the original bits from both nodes, which produces a summed voltage differential between the CANH and CANL wires that can be detected by each of the attached nodes. However, while all of the devices that are attached to the CAN bus can detect the transmission of a dominant bit (logical 0) through the CAN bus, because the two nodes transmit simultaneously the other nodes that are connected to the CAN bus cannot determine which of the two nodes is transmitting the dominant 0 or the non-dominant 1 at any one time during the transmission sequence of the 0/1 bit followed by the logical complement, and only the two transmitting nodes do know which bit is being transmitted. The two nodes transmit the logical 0 and 1 bits and their logical complements in a randomized manner (if both nodes transmit a logical 00/11 sequence or logical 11/00 sequence then the transmission is ignored since those signals do enable third parties to determine the data transmitted from each node), which prevents other nodes connected to the CAN bus from detecting the identity of the node that transmits each bit. This operation, which is repeated many times and combined with other techniques that are not described in greater detail herein, forms the foundation to enable two nodes—and indirectly even larger groups of nodes—to exchange data that form the basis for shared cryptographic keys. After the nodes have exchanged cryptographic keys, those shared keys are used to perform data encryption and authentication/verification operations using techniques that are otherwise known to the art that enable different subsets of the nodes on the bus to exchange data that cannot be decrypted or altered in an undetectable manner by other nodes that are connected to the CAN bus.

As described above, nodes that are connected to the CAN bus with standard CAN bus transceivers can detect the voltage signals corresponding to logical 0 and 1 levels through the CANH and CANL wires of the CAN bus. When two nodes transmit a logical 0 and 1 simultaneously, the transceivers of most standard CAN nodes cannot determine which of the two nodes transmitted the logical 0 and 1. However, at a physical level the electrical signals that are transmitted through the CAN bus do not perfectly correspond to the logical 0 and 1 levels of digital logic that are described above because the physical components of the CAN bus and the nodes themselves have complex and different analog electrical properties. In some instances, an adversary, which is either a legitimate hardware node in the CAN bus that has been compromised by malicious software or an unauthorized hardware device that is electrically connected to the CAN bus, performs high-precision measurements of the properties of the electrical signals that are transmitted through the CAN bus in a manner that may enable the adversary to determine which node transmits the logical 0 and which node transmits the logical 1 signal in the process that is described above. In particular, since both nodes transmit a logical 0 and logical 1 in the randomized order for each bit exchange, the adversary can monitor signal characteristics of the dominant bit signal (the logical 0) that is transmitted from each node. The adversary can then reconstruct the secret data that is shared between the two nodes and compromise the security of the CAN bus system.

This class of attacks is referred to as a side-channel attack because the adversary extracts information based on precise electrical signal measurements that are affected by the physical properties of the bus and the nodes that are connected to the bus in a particular CAN bus system even though the adversary has not defeated the logical protocol for cryptographic key exchange that is described above.

FIG. 1 depicts an example of a prior art CAN network 100 that includes three CAN nodes 104, 106, and 108 that are each connected to a CANH conductor 112 and CANL conductor 116 that are terminated by resistors 118 to form a CAN bus. The adversary node 124 is also electrically connected to the CAN bus and the adversary node includes electrical signal measurement and signal processing hardware that enables the adversary to perform one or more side-channel attacks. As described above, side-channel attacks present challenges to maintaining security in shared medium communication networks such as CAN bus. Consequently, improvements to methods and systems that reduce or eliminate the threats from these side-channel attacks would be beneficial.

SUMMARY

The embodiments described herein include countermeasures to secure a CAN bus or other network that uses a shared communication medium from adversaries that can physically probe the shared communication medium. The embodiments described herein include methods to determine and set the order of communication between nodes participating in a group cryptographic key exchange process to minimize leakage to the adversary. The embodiments described herein use a gateway node (master node) to estimate the leakage due to node interaction using physical modeling and learning based methods. The embodiments described herein optimize the node order to minimize overall leakage, based on the leakage function estimated by the gateway node. Different criteria were proposed for minimization, including total leakage minimization and minimization of maximum-link leakage. The embodiments described herein communicate the node-order to the nodes in a privacy preserving manner, by hiding the node order from an eavesdropper.

In one embodiment, a method for operation of a communication network to reduce leakage of data to an adversary that can observe signals transmitted through the communication network has been developed. The method includes generating a ranking to order operation of a plurality of nodes in the communication network that exchange data in a group cryptographic key exchange process based on a leakage map of the nodes, the ranking minimizing leakage of data through a shared communication medium during the group cryptographic key exchange process, transmitting, with a gateway node in the communication network, the ranking to the plurality of nodes through the shared communication medium, and performing, with the plurality of nodes, the group cryptographic key exchange process in an order of operation specified in the ranking to enable the plurality of nodes to exchange a shared cryptographic key through the shared communication medium while minimizing leakage of data through the shared communication medium.

DETAILED DESCRIPTION

Figure 1:
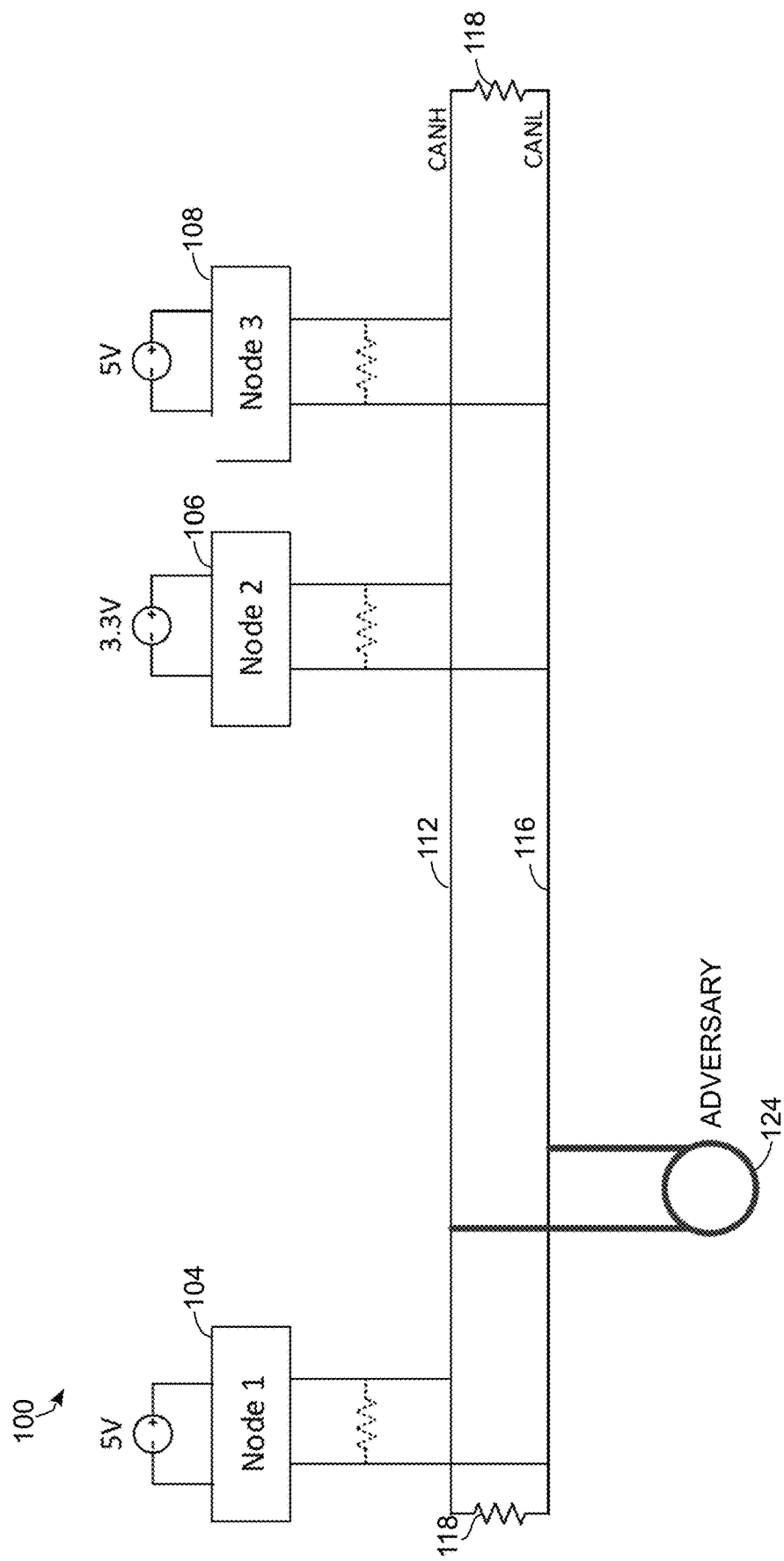
FIG. 1 is a schematic diagram of a prior art CAN bus system.

For the purposes of promoting an understanding of the principles of the embodiments disclosed herein, reference is now be made to the drawings and descriptions in the following written specification. No limitation to the scope of the subject matter is intended by the references. This disclosure also includes any alterations and modifications to the illustrated embodiments and includes further applications of the principles of the disclosed embodiments as would normally occur to one skilled in the art to which this disclosure pertains.

As used herein, the term "bit" refers to a binary value that can have one of two discrete values, which are typically represented as a "0" or "1" in text. Communication systems generate signals with different voltage levels, phases, or other signal characteristics that represent the two values of a binary bit during transmission of data. As is well-known to the art, digital data includes a series of one or more bits that can represent numbers, letters, or any other form of data and, in particular, a set of bits can form a cryptographic key. As used herein, the terms "logical complement" or "inverse" as applied to binary values are interchangeable and refer to a set of data or an operation that changes the values of each bit of binary data (e.g. the binary sequence "101" is the logical complement of "010"). As described in more detail below, a protocol for secure key exchange leaves different nodes with sets of corresponding bits for shared keys that are logical complements of each other. Selected sets of the nodes perform an inversion operation so that all of the nodes have the same shared key.

As used herein, the term "key" or "cryptographic key" refers to a sequence of bits that two or more nodes in a communication network use to perform cryptographic operations including the encryption and decryption of data and for authentication of transmitted data. A "shared key" refers to a key that is known to two or more nodes that communicate with each other but the shared key is not otherwise known to third parties, including adversaries. The methods and systems described herein enable two or more nodes in a communication network to generate a shared key that an adversary cannot identify even if the adversary can monitor any communication that occurs between the nodes and is capable of performing the side-channel attacks that are described herein. After the shared keys are generated, the nodes perform cryptographic operations that are otherwise well-known to the art and are not described in greater detail herein.

As used herein, the term "shared communication medium" refers to a physical network connection and network communication protocol in which multiple nodes transmit and receive data in a manner where any transmission from a single node is received by all other nodes that are connected to the shared communication medium. In a shared communication medium, two or more nodes can transmit data simultaneously. The shared communication medium is considered an "insecure" or "untrusted" communication channel because an adversary is assumed to have the ability to monitor any and all communications that occur through the shared communication medium.

Two non-limiting examples of shared communication media include the Controller Area Network bus (CANbus) network communication bus and protocol and the $I^2C$ bus. In both of these embodiments, all nodes that are communicatively connected to the shared communication medium can observe all signals that are transmitted through the communication medium, including signals that are not intended for receipt by a particular node. As described in more detail below, each node is a computing device that includes a transceiver configured to both transmit and receive signals through the shared communication medium to one or more additional nodes.

As described above, an adversary performs one or more types of side-channel attack to determine which node in a pair of simultaneously transmitting nodes transmits a logical 0 or a logical 1 through a shared communication medium. Three types of side-channel attacks include voltage attacks, transient signal attacks, and timing attacks. In a voltage side-channel attack the adversary node makes precise measurements of the steady state voltage levels of bits that are transmitted from different nodes to identify the node that transmits the dominant bit (logical 0) based on small variations in the voltage level for different nodes in a network. In a transient signal side-channel attack, the adversary makes precise measurements of the signal characteristics in the transient change in voltage level that occurs when a node begins transmission of a dominant bit, where different nodes exhibit different transient signal characteristics. In a timing side-channel attack, the adversary node measures small differences in the times at which signals are observed in a CAN bus due to variations in the transmission times from individual nodes and signal propagation delays as signals are transmitted through the CAN bus.

The embodiments described herein optionally employ nodes that are specifically configured to reduce or eliminate some or all of the side-channel attacks described above. More specifically, U.S. Provisional Application No. 62/468,705, which was filed on Mar. 8, 2017, describes mitigation of voltage side-channel attacks in shared communication medium networks. U.S. Provisional Application No. 62/468,669, which was filed on Mar. 8, 2017, describes mitigation of transient side-channel attacks in shared communication medium networks. U.S. Provisional Application No. 62/468,680, which was filed on Mar. 8, 2017, describes mitigation of timing side-channel attacks in shared communication medium networks. The methods and systems of mitigating side-channel attacks in these applications are non-limiting examples of techniques that can be combined with the embodiments described in this application to reduce the effectiveness of side-channel attacks. However, the potential for leakage of information remains even when anti-side-channel attack mitigation techniques are incorporated into a shared communication medium network. The amount of leakage can increase if a group of more than two nodes needs to perform a cryptographic key exchange process because the total number of transmissions increases in a sequence. The embodiments described herein enable a shared communication medium network, such as CAN Bus network, to identify and reduce the total amount of leakage that occurs when groups of nodes perform a group cryptographic key exchange process that generates a shared cryptographic key between three or more nodes.

Figure 2:
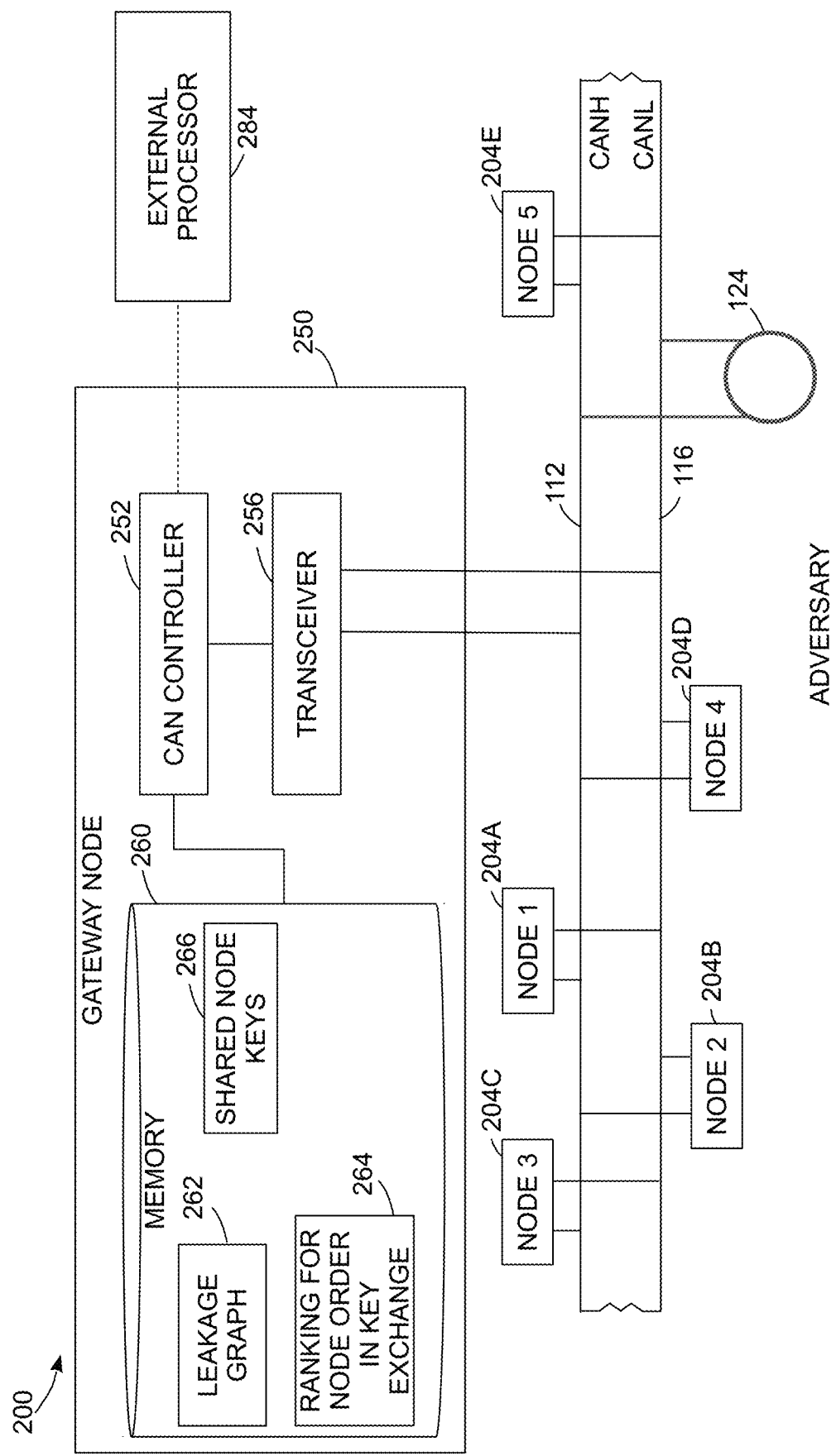
FIG. 2 is a schematic diagram of a CAN bus system that controls the order of operation of nodes in the CAN bus system to minimize leakage of information to an adversary node during a group cryptographic key exchange process.

FIG. 2 depicts a CAN bus system 200 that includes five nodes 204A-204E that are connected to a CAN bus including the CANH conductor 112, CANL conductor 116, and terminating resistors 118. The system 200 also includes a node 250 that is referred to as the gateway node that is connected to the CAN Bus and the adversary node 124 is also connected to the CAN Bus. The nodes 204A-204E can perform cryptographic key exchange to form a shared group key for a cryptographic key that is shared between three or more nodes as described below, although the nodes 204A-204E are also capable of exchanging a cryptographic key with one other node. Prior to commencement of the group cryptographic key exchange process, the gateway node 250 transmits the order in which nodes are added to the group to each of the nodes 204A-204E that are to be included in the group.

The gateway node 250 in the system includes a CAN controller 252 that is operatively connected to a CAN transceiver 256 and a memory 260. The CAN controller 252 is a digital logic device that includes one or more microprocessors, microcontrollers, digital signal processors (DSPs), field programmable gate arrays (FPGAs), application specific integrated circuits (ASIC), and any other suitable digital logic device configured to perform the operations described herein. The CAN transceiver 256 is an electronic transceiver device that includes input/output lines that are connected to the CANH wire 112 and CANL wire 116. The CAN transceiver receives data via the CAN bus, including receiving signals from the CAN bus and transmitting data through the CAN bus to the nodes 204A-204E. In some embodiments the CAN transceiver 256 also includes additional signal processing hardware including oscilloscopes, high resolution analog to digital converter (ADC) circuits, digital signal processors, and the like that enable the CAN controller 252 to record signal characteristics of signals that the nodes 204A-204E transmit through the CAN bus in order to generate estimates of the leakage in transmissions between different pairs of the nodes 204A-204E. The memory 260 includes both volatile memory devices such as random access memory (RAM) and non-volatile memory devices such as magnetic disks or solid-state memory devices. The memory 260 holds stored program software/firmware instructions for execution by the CAN controller 252 as well as a graph of the estimated node to node leakage graph data 262, stored data of the ranking order for node transmission 264 that sets the order of operation of the nodes during the group cryptographic key exchange process, and a set of shared cryptographic keys 266 that gateway node 250 shares individually with the nodes 204A-204E.

Each of the nodes 204A-204E in the system 200 includes a CAN controller and a CAN transceiver that connects each node to the CAN bus depicted in FIG. 2. Additionally, the nodes 204A-204E optionally include additional hardware and software elements that implement countermeasures against the voltage, transient, and timing side-channel attacks that the adversary node 124 performs against the system 200.

The system 200 optionally includes an external processor 284 that is communicatively linked to the gateway node 250 via a peripheral or network data connection other than the CAN bus. The external processor 284 is, for example, a server computing device using standard commercially available processors (e.g. x86, ARM, PowerPC, MIPS, etc. processors) and, in some embodiments, hardware acceleration devices that perform machine learning operations in an efficient manner. The external processor 284 is an optional hardware element that performs some of the processing described below to generate a graph of estimated leakage levels between the nodes 204A-204E and to perform a ranking process to assign an order of transmission to different subsets of the nodes 204A-204E in embodiments where the CAN controller 252 in the gateway node 250 lacks the computational power to perform these operations in an efficient manner.

As described in more detail below, the gateway node 250 controls the order in which the nodes 204A-204E perform the cryptographic key exchange operation to minimize the total amount of leakage of information to the adversary 124. Minimizing leakage is of course always desirable, but in some group cryptographic key exchange embodiments, the process amplifies potential issues with leakage since adding additional nodes to a group results in an above-linear increase in the number of transmissions that need to be made in a secure manner in the presence of the adversary 124. In one simplified example, assume the five nodes 204A-204E of FIG. 2 exchange a shared cryptographic key that includes 128 bits. During the simultaneous bit transmission process between nodes, on average one half of the bit transmissions between nodes need to be discarded when the two nodes both transmit a logical 00/11 or 11/00 sequence instead of the 01/10 or 10/01 sequences. Thus, on average the first pair of nodes needs to transmit a total of 2048 randomly generated bits to ensure that the fifth node at the end of four pairs of nodes still has 128 bits of successfully transmitted data that come from the original pool of 2048 bits. The 2048 bit number is derived from for four node pairing operations that are required to exchange the cryptographic key data for five nodes, and there is an average probability of $0.5^4$ (50% chance of success in each transmission raised to the fourth power for four transmissions) that any individual bit will successfully be propagated to the final node in the group, which results in 128 bits/$0.5^4$=2048 bits. Put another way, on average 1024 usable bits remain after the first pair of nodes exchange the cryptographic key data, 512 bits after the second pair, 256 bits after the third pair, and 128 usable bits remain at the final node in the five node example provided above. Of course, these numbers are only averages since in some situations more bits may be required due to random loss of bits during the cryptographic key exchange process. Additionally, since the key exchange process actually requires two transmissions for each bit (the two nodes both simultaneously transmit a bit followed by the logical complement of the bit as described above), the total number of transmissions is actually doubled again to 4096 transmissions, although the number of bits is used as a metric for explanatory purposes here.

The transmission of, on average, a total of 3840 bits (2048 bits+1024 bits+512 bits+256 bits for all of the node pairs) to share a group cryptographic key between five nodes is substantially larger than the average number of bits that would be required to simply share four cryptographic keys between the five nodes individually, which would result in a total of 1024 bits on average, or 256 bits required on average for each pair of nodes. Unlike sharing a key between only two nodes, the group cryptographic key exchange process needs to use a single larger pool of key bits, such as the original pool of 2048 bits described above, because all of the nodes that have previously exchanged data in the key exchange process also monitor the CAN bus and have a priori knowledge of the next bit being transmitted by the node that is already part of the group. Thus, new bits cannot effectively be transmitted part way through the cryptographic key exchange process because the nodes that are already part of the group need to have a record of the bits being transmitted.

For example, when four nodes have already shared data in the group, the four nodes in the group monitor the transmissions that are made to the fifth node to determine which set of the transmitted bits successfully reach the fifth node to form the final 128 bit key. During the monitoring process, the nodes that are already in the group discard bits that fail during transmission when the next node being added to the group randomly transmits the same bit of data as the node in the pair that is already in the group. For example, assume that bit number 2000 in the 2048 bit pool has a binary value of "1" that is stored in the memories of four nodes in the group during the cryptographic key exchange process that adds the fifth and final node in the group. The selected node that communicates with the fifth node transmits the "1" value (followed by the logical complement 0) while the fifth node simultaneously transmits a randomly generated bit value. If the fifth node transmits 0 (followed by 1), then the two bits are successfully exchanged and all four of the nodes in the group record the successful transmission. Each bit that is successfully transmitted through all of the node pairs in the group forms a part of the shared cryptographic key. If, however, the fifth node transmits 1 followed by 0, then bit number 2000 is discarded since this bit is not used in the final shared cryptographic key, and each of the four nodes in the group observes the failed transmission and deletes the bit.

While the group cryptographic key exchange process described above potentially results in increased leakage due to differences in the numbers of bits that are transmitted between each pair of nodes in the group, alternative techniques for group cryptographic key exchange avoid the issues described above but still require a node order ranking optimization to minimize the leakage of information. In another embodiment, of the linear and group protocols, the nodes process the result of any pairwise key agreement stage using cryptographic functions, to reduce the number of truly random bits required for each stage. In such embodiments, the number of bits at each stage is equivalent, thus the side-channel leakage is a function of the mismatches between the communicating node pairs, and does not vary due to the position of the node pair in the group. Still other embodiments use identically seeded cryptographically secure pseudo-random number generators (PRNGs) in nodes that have already joined the group to enable all of the nodes in the group to know the value of the bits being transmitted as a new node is added to the group since the PRNG produces additional bits in a deterministic order that cannot be predicted by the adversary node. These are non-exclusive examples of embodiments in which each pair of nodes transmits the same or approximately the same number of bits to perform the group cryptographic key exchange process.

The group cryptographic key exchange processes described above are examples of a key exchange process for groups of nodes that include more than two nodes. One variation of these processes is a linear process (GroupKey-Basic) that uses the most recently added node in the group acting as the transmitter for the next node to be added to the group in a predetermined linear order. Another variation is a tree configuration (referred to as GroupKeyTree) in which any node that has already participated in the key exchange process can be the next node to communicate with a selected node that has not yet joined the group until the cryptographic key has been shared with all of the nodes. The Group-KeyTree treats nodes that have already joined the group as higher branches in a tree, where any higher branch can communicate with a lower branch in the tree that has not yet joined the group. The cryptographic key exchange process between different pairs of nodes produces leakage to the adversary at different levels based on the physical properties of the CAN bus system 200. The gateway node 250 in the system 200 estimates the amount of leakage between different pairs of nodes in the system 200 and uses the leakage information to generate the leakage graph 262. The gateway node 250 minimizes the total amount of leakage by generating a ranking 264 that orders the operation of the node pairs to minimize the leakage for each pair individually or to minimize the total amount of leakage for the entire group. In the system 200, the external processor 284 optionally performs some or all of the generation of the leakage graph and the generation of the ranking based on data received from the gateway node 250. The gateway node 250 handles distribution of the ranking to the nodes 204A-204E as is described below. This node ranking process reduces the ability of the adversary 124 to observe bits transmitted between nodes with high leakage levels, which reduces the effectiveness of side-channel attacks and improves the security of the system 200.

Figure 3:
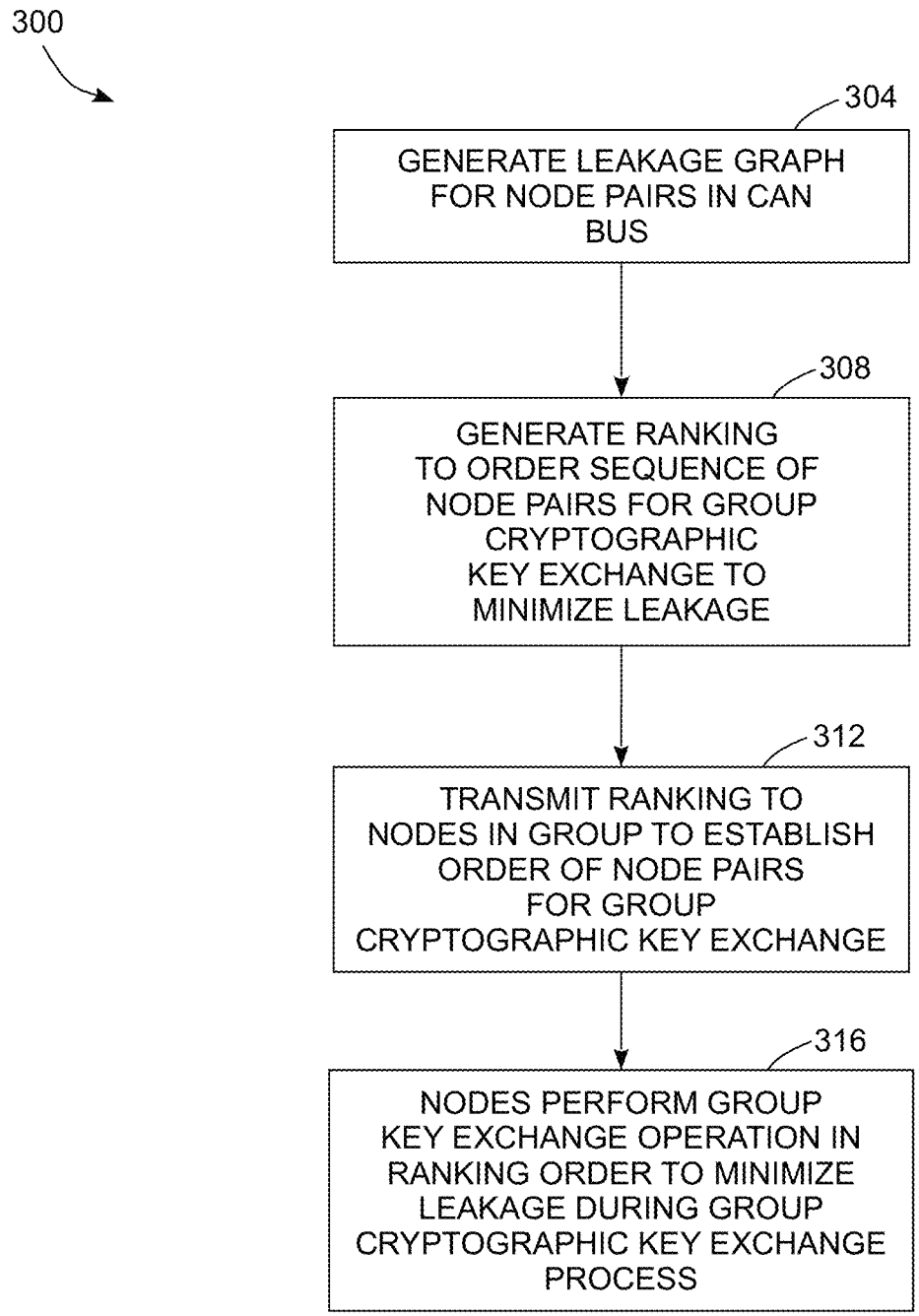
FIG. 3 is a block diagram of a method for controlling the order of operation of nodes in a CAN bus system to minimizing leakage of information to an adversary node during a group cryptographic key exchange process.

FIG. 3 depicts a process 300 for operation of nodes that are connected to a shared communication medium to enable a gateway node to detect leakage levels between pairs of nodes and to order the operation of the nodes to perform a group cryptographic key exchange operation while minimizing leakage of data to an adversary node. In the description herein, a reference to the process 300 performing a function or action refers to the operation of a processor or controller in a node of a communication network or another computing device to execute stored program instructions to perform the function or action in conjunction with other components in the communication network. The process 300 is described in conjunction with the system 200 of FIG. 2 for illustrative purposes.

During the process 300, the gateway 250 performs a mapping process that generates a leakage graph that includes a weighted graph of the relative levels of leakage that occur when any pair of the nodes 204A-204E transmit data bits simultaneously through the CAN bus during a cryptographic key exchange process (block 304). The mapping embodiments described below use the gateway node 250 as an observer in the CAN network in a similar manner to the operation of the adversary 124 to generate observations of the transmissions of signals from the nodes 204A-204E through the CAN network depicted in FIG. 2. The physical properties of the nodes 204A-204E and their specific configuration, such as the relative physical positions and computed inter-node distances, in the CAN Bus system 200 affect the properties of the electrical signals. In particular, the hardware configuration and position of each of the nodes 204A-204E contributes the total impedance level of the CAN bus 200, and the configuration and length of the conductors 112 and 116 in the CAN bus also affect the characteristics of the transmitted signals. In some embodiments the CAN controller 252 performs the mapping process while in other embodiments the CAN controller 252 sends observations received from the transceiver 256 to an external processor 284 through a peripheral connection or data network for generation of the leakage graph.

In one embodiment, to generate the graph the gateway node 250 performs a physical feature classification process based on observations of signals that are transmitted between the nodes 204A-204E through the CANH conductor 112 and CANL conductor 116 in the CAN Bus of the system 200. In this configuration, the gateway node 250 operates in a similar manner to the adversary 124. Thus the aim of the adversary to attempting to break such a system is to successively differentiate between the signals in simultaneous transmissions between pairs of nodes. An adversary eavesdropping on the bus may sample the physical signal on the bus at a very high frequency, where the samples are denoted as $x=\{x_{-\infty}, \ldots, x_0\}$, $x_i \in X$ where the $x_{-\infty}$ represents the oldest sample and $x_0$ is the most recent sample. The gateway 250 uses the transceiver 256 or additional signal processing devices such as an oscilloscope or other suitable analog measurement circuit with a high resolution analog-to-digital converter to measure signals through the CAN bus. In the physical feature classification process, the signal observations do not have to be made while two nodes transmit data simultaneously during a cryptographic key exchange process. Instead, many if not all of the observations occur during a normal CAN bus operation when the nodes 204A-204E transmit data individually and no other node in the system 200 transmits data as is standard for CAN bus data transmissions.

In a system with M nodes, where M=5 for nodes 204A-204E in the example of FIG. 2 (excluding the gateway node 250). The gateway 250 partitions the observations in transient signals, $x_{tr}$, and steady state signals $x_{ss}$, i.e. $\{x_{tr}, x_{ss}\}$. For data frames with identification information, such as an identifier of the sending node, the gateway node 250 also assigns observed signals to one of the M nodes. The gateway 250 and optionally the external processor 284 implement one or more supervised and unsupervised machine learning techniques to train a classifier C that identifies nodes based on the observed signal features that known to be associated with the different nodes: C: $X^* \rightarrow \{1, 2, \ldots M\} \times [0,1]$. The classifier C can estimate the identity of the transmitting node based on the sequence of inputs of arbitrary length: $(\widehat{Node}_r, c_r) = C(x_1, x_2, \ldots, x_r)$ where $\widehat{Node}_r$ represents the estimate of the node identifier (e.g. one of nodes 204A-204E in FIG. 2) based on r samples and $c_r$ represents a vector of confidence values in which each confidence values correspond to one of the nodes that could have transmitted the observed signal. In one embodiment $c_r \in [0,1]$, which corresponds to a binary yes/no classification for each node, although other embodiments may assign fractional confidence levels to different nodes as well. The classifier C can be implemented using various types of classification algorithms that are known to the art in the field of machine learning. Examples of suitable classification algorithms include supervised learning techniques such as Support Vector Machines (SVM), Recurrent Neural Networks (e.g. Long short-term memory (LSTM) neural networks), and Convolutional Neural Networks, and unsupervised learning techniques such as k-means clustering, to provide an efficient classifier. The classifier C may further include a hierarchy of sub-classifiers that focus on different features in the observed signal data, such as one classifier $C_{ss}$ that focuses on the steady state features of the signals and another classifier $C_{tr}$ that focuses on the transient features of the signals. The classifier training process described above may not be practical to implement in the CAN controller 252 of the gateway node 250 in some embodiments, so in these embodiments the gateway node 250 collects the samples x described above and transmits the sample data to the external processor 284 for generation of the trained classifiers.

The machine learning classifiers described above when applied to signal classification during a cryptographic key exchange process when two nodes transmit data simultaneously do not necessarily identify the node that transmits the logical 0 and 1 signal with perfect accuracy. However, the adversary 124 can perform an attack by simply distinguishing between the transmissions from the two participating nodes. For example, two of the nodes i and j transmit data simultaneously to exchange n bits of cryptographic key data. The gateway node 250 acts as the adversary node 124 to observe r samples for each event in the transmission including the transition and steady state features described above ($\{x_1^i, x_2^i, \ldots, x_r^i\}$, $1 \le i \le n$. The gateway node 250 uses one or more decision functions using the trained classifiers based on assumptions about the operation of the adversary 124 and generates estimates of the relative leakage levels for transmissions between pairs of the nodes 204A-204E to enable the gateway node 250 to generate the leakage graph.

Decision Function Using Trained Classifiers

The gateway node 250 or the external processor 284 use the trained classifiers that are described above to implement decision functions that produce an output that identifies one node as the transmitter of a particular signal based on observed signal data. The decision functions utilize the generic trained classifiers that are described above, and optionally node-specific classifiers, and apply them to the constrained scenario of the key exchange between node pairs, wherein only two nodes are transmitting, to identify which node transmits the dominant bit in each bit interval. The output of the decision function is the classification of the trained classifier to select one node from the two nodes that is most likely to have transmitted the observed signal. Given the adversary the knowledge that only two nodes are transmitting (as it occurs in the key generation protocols), then the classification becomes easier, because the classifier only has to distinguish between two nodes.

The gateway node 250 or the external processor 284 uses the decision functions that are described in further detail below to mimic the operation of the adversary node 124 as part of a process to generate the graph of leakage between nodes in the system 200. The decision functions act upon the outputs of the trained classifiers that are described above to produce an output (the "decision") that produces an output classification identifying a particular node based on the confidence level data from the output of the classifier that is described above. Each decision function generates an output that assists in revealing cryptographic key data to an adversary node 124 or the gateway node 250 based on observed signals in the CAN bus using at least one of the classifiers that are described above. Of course, the adversary node 124 is not required to implement the specific decision functions that are described below, but the gateway node 250 uses the decision functions described below as the basis of likely techniques that an adversary node 124 would use to compromise the security of the group cryptographic key exchange operation as part of the process for generating a graph of leakage levels between pairs of nodes in the system 200.

In one configuration, the gateway node 250 implement a decision function $D_{x,y}: X^m \rightarrow \{0, \overline{0}\}^n$ that estimates the sequence of the transmitting signals x and y based on the r samples collected above that act as input observations. The term $\{0, \overline{0}\}$ represents a differentiation between two different transmitting signals but does not directly mean identification of the transmitting nodes, meaning that the decision function can identify features of the two different signals from the nodes but does not produce an output that directly identifies the node that produces each signal. This represents an easier problem for the adversary to solve, and thus can be achieved by a much weaker attacker. Put another way, the decision function described above may not be able to fully identify the node that transmits the logical 0 and 1 in each transmission, but over a sequence of bit transmissions the decision function can, with higher probability than merely guessing, distinguish the signals that correspond to one node versus the other node, which still enables the decision function to be effective in revealing the contents of the cryptographic key.

In another configuration, the gateway node 250 has sufficient training data to identify, with high reliability, the participating nodes i and j that transmit the signals simultaneously, and implement a decision function $D_{i,j} = (H_{i,j} \circ C)^n$ where the decision function $D_{i,j}$ is a composition of a binary classifier $H_{i,j}$ that is specific to nodes i and j and the general classifier C. The binary classifier is denoted as $H_{i,j}: \{1, 2, \ldots, M\} \times [0, 1] \rightarrow \{i, j\}$. The decision function $D_{i,j}$ uses the result of the classifier and outputs a binary decision. Based on the available information, such as in scenarios where the data with node identifiers is available for training, the adversary node 124 and the gateway node 250 may directly train a family of decision functions, $\{D_{1,2}, D_{1,3}, \ldots, D_{M-1,M}\}$ that specifically target pairs of nodes (e.g. node pairs 204A, 204B; 204A, 204C, etc.) in the CAN bus system instead of relying on a general classifier C.

For scenarios in which the gateway node 250 does not have knowledge of the participating nodes or where the training data is unlabeled, the node may utilize a generalized decision function $D_{0,\overline{0}}: X^m \rightarrow \{0, \overline{0}\}^n$, which uses the classifier in combination with a selection approach (such as maximum likelihood based estimator) to select the most likely decision function to differentiate between the transmitters. Given the class of all blind estimator decision functions $D = \{D_{0,\overline{0}}\}$ then the decision function $D_{i,j}$ described above is the most optimal estimator for a given pair of nodes i, j. This means that if the adversary node 124 has knowledge of the identities transmitting nodes in the cryptographic key exchange process, then the adversary node 124 can use a specific decision function $D_{i,j}$ for those particular nodes to improve the effectiveness of the side-channel attacks. As described in further detail below, in some embodiments the gateway node 250 encrypts the ranking data that establishes the order of communication for the nodes in the group cryptographic key exchange process to prevent the adversary node 124 from being able to easily identify which two nodes are exchanging bits of data at any one time. The gateway node 250 optionally computes a message authentication code (MAC) to prevent modification of the encrypted ranking data by the adversary node 124.

Node Leakage Graph

In the process 300, the gateway node 250 and optionally the external processor 284 map the levels of node leakage using the decision functions to generate a graph with weighted values that correspond to leakage levels between the pairs of nodes. The description of the node leakage levels in the graph may also be referred to as the "distance"

between nodes in the graph even though the "distance" does not necessarily correspond to the physical distance between nodes on the CAN Bus unless specifically described as such below. The term "distance" is used because the gateway node 250 performs an optimization process to minimize the "distance" (e.g. total leakage) in the graph starting with the lowest leakage paths for the earliest nodes in the cryptographic key exchange process to minimize the total path distance (and leakage) when traversing the graph, where traversing the graph corresponds to the order of node pairs that perform the group cryptographic key exchange operation.

In some embodiments, the gateway node 250 generates estimates of the level of leakage between nodes to generate the node leakage graph using empirical data based on a large number of observations of the signals that are transmitted through the CAN bus and one or more of the decision functions D that have also been generated based on empirical observations of the signals that are transmitted through the CAN bus to define the leakage based on the probability (Pr) of successfully differentiating between the transmitters of two successive bits. Here, the probability Pr refers to the probability that the decision function is correctly able to differentiate between the transmitters of the two successive transmissions that form a bit (e.g. the logical complement 01 transmission from one node i while the other node j simultaneously transmits 10 or 10 from i while j simultaneously transmits 01). The $x^i$ and $y^i$ sequences below mean that both bits were transmitted by node i. So if the decision function outputs a 0,0, meaning that both transmitters of both bits is the same, then the decision function was successful. Similar metrics for success are applicable the other probability terms depicted below for all four of the two-bit logical complement combinations that are produced by the nodes i and j. Using the term $x_k^i$ as the k-th sample that is transmitted from node i, the distance $d_{i,j}^r$ between nodes i and j is defined as:

$$d_{i,j}^r = \frac{1}{4}(Pr(D_{i,j}(\{x_1^i, \ldots x_r^i\}\{y_1^i, \ldots, y_r^i\}) = (0,0)) +$$
$$Pr(D_{i,j}(\{x_1^i, \ldots x_r^i\}\{y_1^i, \ldots, y_r^i\}) = (0,\bar{0})) +$$
$$Pr(D_{i,j}(\{x_1^j, \ldots x_r^j\}\{y_1^j, \ldots, y_r^j\}) = (0,\bar{0})) +$$
$$Pr(D_{i,j}(\{x_1^j, \ldots x_r^j\}\{y_1^j, \ldots, y_r^j\}) = (0,0))$$

The distance estimate generated above assumes that the leakage levels as applied to a graph are the same going from node i to j as going from node j to node i, which is generally reasonable since the estimate of leakage occurs when both nodes are transmitting simultaneously. The example provided above uses the more specific decision function $D_{i,j}$ that is specifically generated for one pair of nodes i and j. As depicted above, two vertices in the leakage graph that correspond to the two nodes i and j are connected by a weighted edge where the value of the weighted edge $d_{i,j}^r$ is generated based on a probability of the decision function $D_{i,j}$ that uses the classifier generating an output that successfully identifies two successive transmissions from the first node and the second node in the plurality of nodes.

Another estimate can be generated in embodiments that use the more general decision function $D_{0,\bar{0}}$ that assumes the adversary does not have knowledge of which specific pair of nodes is transmitting the data:

$$dg_{i,j}^r = \frac{1}{4}(Pr(D_{0,\bar{0}}(\{x_1^i, \ldots x_r^i\}\{y_1^i, \ldots, y_r^i\}) = (0,0)) +$$
$$Pr(D_{0,\bar{0}}(\{x_1^i, \ldots x_r^i\}\{y_1^i, \ldots, y_r^i\}) = (0,\bar{0})) +$$
$$Pr(D_{0,\bar{0}}(\{x_1^j, \ldots x_r^j\}\{y_1^j, \ldots, y_r^j\}) = (0,\bar{0})) +$$
$$Pr(D_{0,\bar{0}}(\{x_1^j, \ldots x_r^j\}\{y_1^j, \ldots, y_r^j\}) = (0,0))$$

In another embodiment, the gateway node 250 does not have access to a large set of observed data and decision functions to use in estimating the leakage levels between pairs of nodes. In this embodiment, the gateway node 250 uses physical parameters corresponding to the hardware configurations of specific components of the nodes 204A-204E, the arrangement of the nodes in the CAN bus depicted in FIG. 2, and other physical properties of the components in the system 200 to generate the estimate of the leakage levels between pairs of nodes.

One physical property that affects the leakage level is the location of the nodes along the length of the CAN bus conductors. Nodes at different locations on the CAN bus exhibit different impedance characteristics, propagation delay and timing synchronization characteristics. Thus, as nodes are increasingly physically separated from each other along the CAN bus, the difference in voltage, timing and transients associated with each transmission state and transition increases, which in turn leads to an increase in the leakage level.

Another property that affects the leakage level is the type of CAN bus transceiver that is used in each of the nodes. Transceiver circuits for different family of devices (even from the same manufacturer) often have different signal generation characteristics. This includes drive strength, transmission variation with load impedance and characteristic impedance. These characteristics can impact the voltage and transients observed by an adversary. Thus devices from the same manufacturer, belonging to the same family have the least differences, followed by devices of different families and devices from different manufacturers.

The gateway node 250 or the external processor 284 uses the characteristics described above to generate an estimate of the leakage level between two nodes $d_{i,j}$ as:

$$d_{i,j} = f(\text{physical node distance, difference in architecture and family})$$
$$= \alpha \cdot \frac{|l_{o,i} - l_{o,j}|}{l_{bus}} + (1-\alpha) \cdot A_{i,j}$$

In the equation above, α represents a weighting factor that is determined empirically to balance the contribution of the physical node distance (first term) or the differences in hardware architecture and family (second term) to the final leakage value of $d_{i,j}$, which forms the basis of the weighted value in the leakage graph that connects the vertices corresponding to nodes i and j. The term $l_{bus}$ refers to the total length of the CAN bus (the lengths of the conductors 112 and 116), and the terms $l_{o,i}$ and $l_{o,j}$ represent the physical distance along the CAN bus between the nodes i and j, respectively, and a fixed reference point (e.g. the location of the gateway node 250 or one of the ends of the CAN bus).

The term $A_{i,j}$ is a parameter that provides a numerical value to quantify the difference in families and hardware architectures between the hardware CAN Bus transceivers that generate the signals for the nodes i and j. The parameter $A_{i,j}$ is 0 if the two nodes i and j use identical transceivers. The parameter $A_{i,j}$ is 0.5 if the two nodes i and j use different models of transceiver hardware that are produced by the same manufacturer. The parameter $A_{i,j}$ is 0.75 if the two nodes i and j use transceivers that generate signals using the same operating voltage levels $V_{oper}$ (e.g. both transceivers are driven by 3.3V voltage or a 5V voltage) and the transceivers are from different manufacturers. The parameter $A_{i,j}$ is 1.0 if the two nodes i and j use transceivers that generate signals using different $V_{oper}$ voltage levels (e.g. one transceiver is driven by 3.3V voltage and the other is driven by a 5V voltage) and the transceivers are from different manufacturers. The CAN controller 252 in the gateway node 250 can determine the hardware configuration information for the nodes via a hardware discovery process in which the nodes transmit the information to the CAN controller 252 to identify the hardware model and manufacturer based on serial numbers or other device-specific information. The transceiver 256 in the gateway node 250 can detect the operating voltage levels $V_{oper}$ when each node transmits dominant bit data through the CAN bus.

Figure 4:
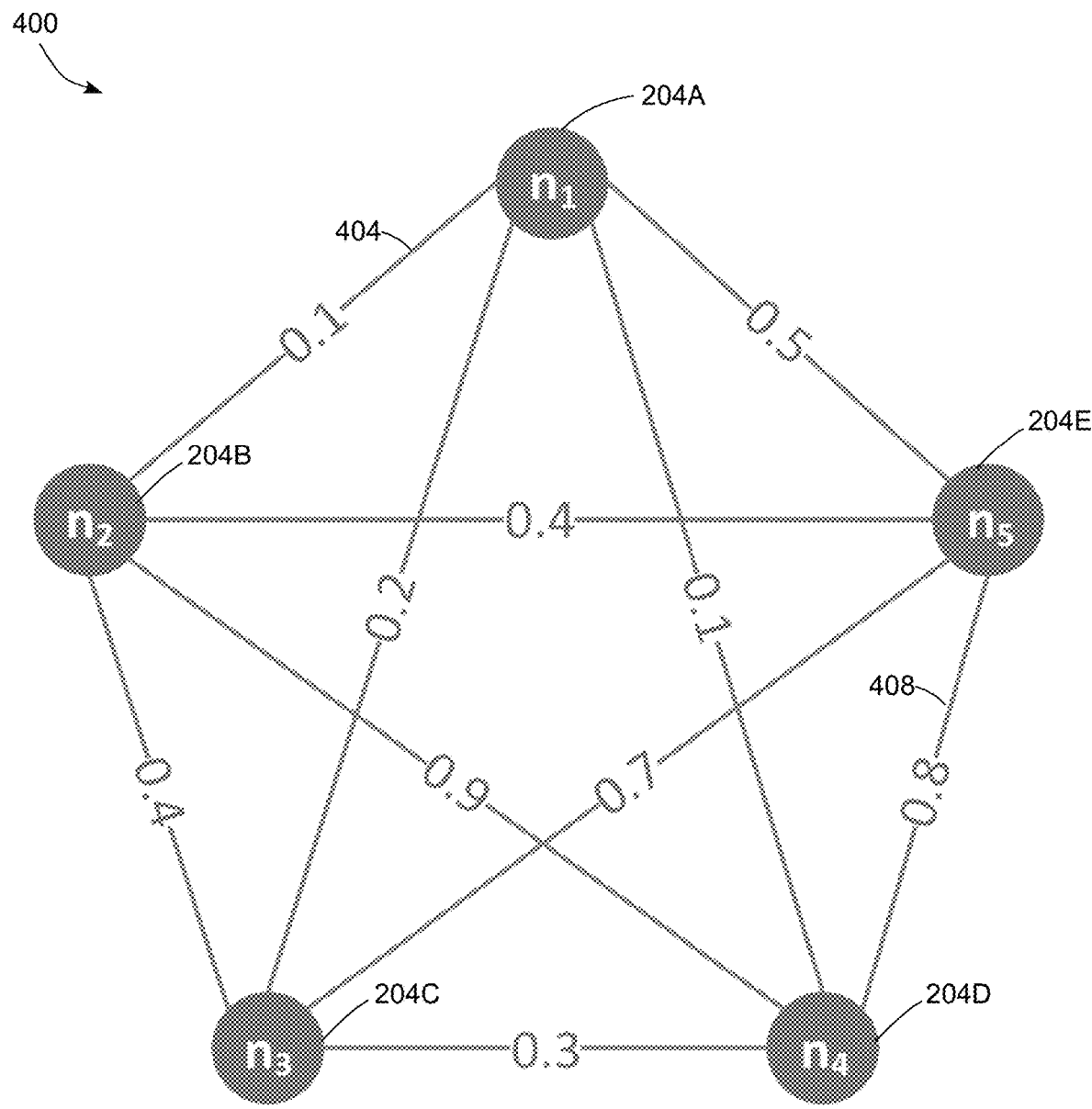
FIG. 4 is a leakage graph depicting estimates of data leakage for transmissions between nodes in a CAN bus system.

After performing any of the embodiments described above, the gateway node 250 stores the leakage graph 262 in the memory 260 prior to performing a ranking process to enable the gateway node 250 or the external processor 284 to perform the ranking process to order the sequence of operation of the nodes 204A-204E during a group cryptographic key exchange process. FIG. 4 depicts an example of a leakage graph 400 that the process 300 generates in the illustrative CAN bus system 200 of FIG. 2. The leakage graph 400 includes five vertices $n_1$ to $n_5$ that each correspond one of the five hardware nodes 204A-204E in the system 200. FIG. 4 labels the vertices $n_1$ to $n_5$ with the node labels 204A-204E for ease of understanding. The graph 400 is a fully connected graph, which is to say that every vertex has weighted edges that connect that vertex to every other vertex in the graph, because in the CAN Bus system 200 each node can communicate directly with each of the other nodes via the CAN Bus conductors 112 and 116. The gateway node 250 and optionally the external processor 284 generates the numeric weight values that are assigned to each of the weighted edges in the graph 400 to indicate the relative amount of leakage that occurs if the nodes corresponding to the two vertices connected by the weighted edge communicate data with each other. For example, the weighted edge 404 connecting the nodes 204A and 204B indicates a relative leakage level of 0.1, which is substantially lower than the leakage level of 0.8 for the weighted edge 408 that connects the nodes 204D and 204E. The numeric weight values depicted in the graph 400 are normalized to a scale of 0.0 to 1.0, but other embodiments can use a different numeric range. As described below, the system 200 uses the leakage graph 400 to determine an order for transmission of bits between the nodes 204A-204E to perform a group cryptographic key exchange process that minimizes the total level of leakage that can be observed by the adversary node 124.

Ranking of Nodes

The process 300 continues as the system 200 generates a ranking that orders the sequence of node pairs for the group cryptographic key exchange process to minimize the total leakage while exchanging the cryptographic key data between all the nodes in the group (block 308). In the process 300, the system 200 uses the leakage graph and a process that determines a minimum leakage path to traverse each of the vertices in the graph to generate the ordering.

Using the complete leakage graph, which is referenced as $K_m$, and the list of nodes $G_k$ in the group that shares the cryptographic key, the goal of the ranking process GW is to order the nodes in $G_k$ such that the overall leakage is minimized. $K_m[G_k]$ is the subgraph induced in KM by $G_k$, which simply means that the ranking process ignores vertices in the leakage graph for any nodes that are not part of the group that shares the cryptographic key. In the examples described herein, nodes 204A-204D are included in a group that shares a cryptographic key while node 204E is ignored in the ranking process. $K_m[G_k]$ is also a fully connected graph.

In the GroupKeyBasic process that is described above, the group cryptographic key exchange process starts with an initial pair of nodes and continues using the second node from each pair as the transmitting node for the key exchange process that adds the subsequent node in the group. This process is similar to a path traversal through the graph in which the path starts at one node and makes "hops" to additional nodes in the group until each vertex has been visited exactly one time on the path (visiting each vertex exactly once makes the path a "Hamiltonian" path). The process of finding the node ordering for group key generation using GroupKeyBasic can be viewed as finding the shortest path that traverses all nodes in $K_m[G_k]$, i.e. the minimal Hamiltonian path in $K_m[G_k]$ without having multiple branches from a single vertex. Several algorithms have been proposed in literature to find such a path based on the minimality criterion and the system 200 may use prior-art routing algorithms used in data networks that seek to minimize the total path length.

Figure 6:
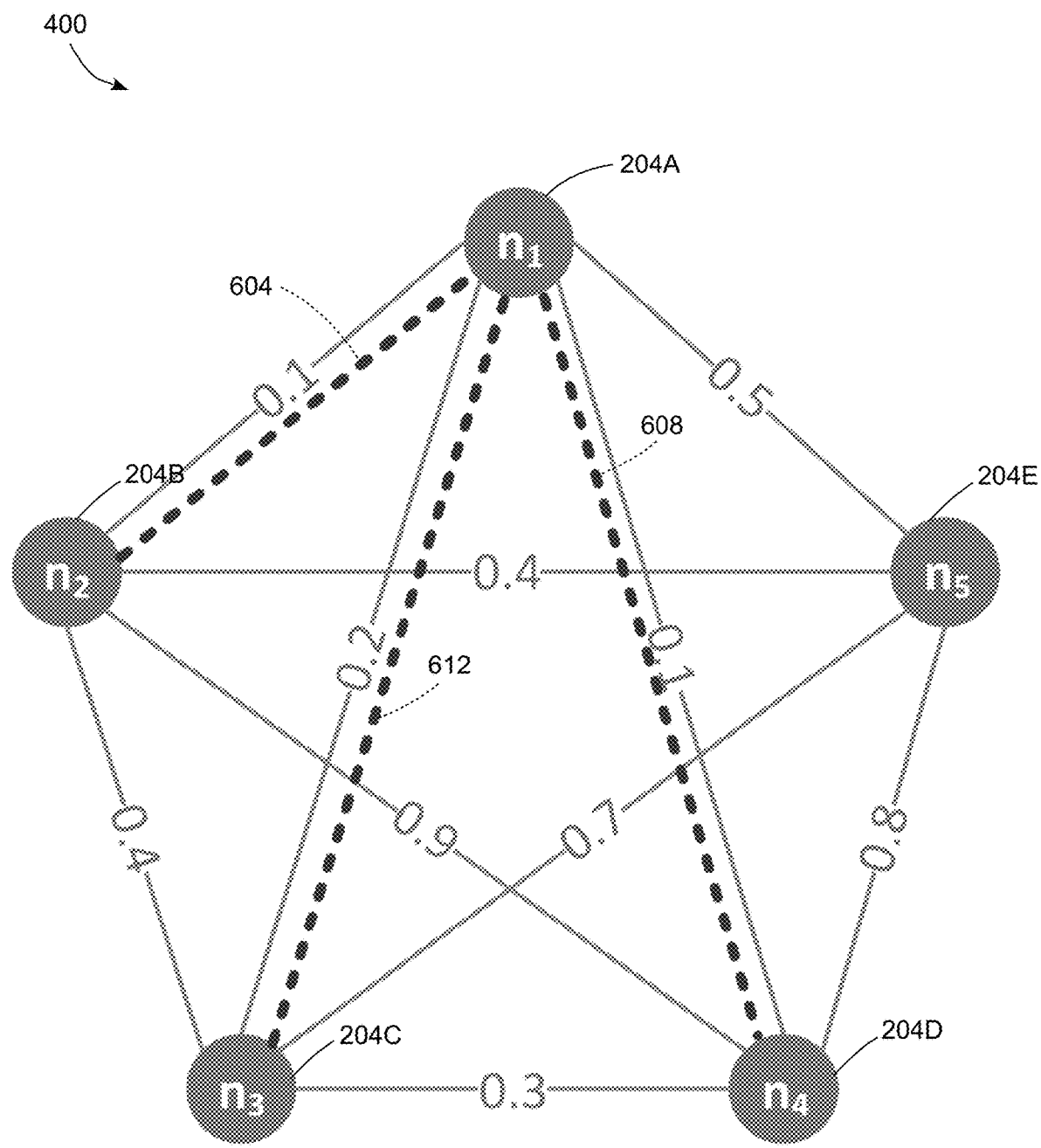
FIG. 6 is a graph depicting another order of operation of nodes to perform a group cryptographic key exchange operation that minimizes leakage based on the leakage graph of FIG. 4.

In the GroupKeyTree process that is described above, the group cryptographic key exchange process starts with an initial pair of nodes and continues using any one of nodes of the group as the transmitting node for the key exchange process that adds the subsequent node in the group. This process is similar to a tree discovery through the graph, where each vertex is visited exactly once but multiple paths may be taken from each vertex, i.e. discovering the spanning tree that optionally includes multiple branches from a single vertex. An example of such a tree is illustrated in FIG. 6 where the vertex $n_1$ corresponding to the node 204A has multiple branches on the weighted edges 604, 608, and 612 to the vertices $n_2$, $n_4$, and $n_3$, respectively. Examples of algorithms that optimize the ordering of nodes include, but are not limited to, Prim's algorithm, Kruskal's algorithm, or other efficient spanning tree algorithms that are known to the art. Since every minimum spanning tree is also a min-max spanning tree, the solutions that minimize total leakage also minimize the max-link leakage.

These algorithms all attempt to minimize the "cost" of traversing the graph with a Cost minimization function:

$$\min_{T \in \tau} c(T)$$

where $\tau$ is all of the available spanning trees for the GroupKeyTree embodiment and c(T) finds a path that minimizes a cost function. For the GroupKeyBasic embodiment, the set T only includes spanning trees which are linear paths that do not include multiple branches from a single vertex. Examples of function c(T) include a max-link leakage cost function $$c(T) = \max_{(i,j) \in T} d_{i,j}$$

where (i,j) represents a weighted edge between two nodes in the graph and $d_{i,j}$ is the leakage value depicted above in the graph 400. This cost function seeks to minimize the maximum leakage over the path, which is relevant for security applications, since the security of system is a function of the weakest link. Another cost function that minimizes the total cost along the entire path is the total-leakage cost function that defines the cost as the sum of all leakage on the path: $c(T)=\Sigma_{(i,j)\in\tau}d_{i,j}$.

As described above, in some embodiments the adversary 124 may attempt to perform the same ranking process as the system 200 to guess the ranking of nodes and enable the adversary node 124 to use node-specific decision functions when performing side-channel attacks. In some embodiments, the system 200 also incorporates a function $f(\bullet)$ that adjusts the costs based on the various side-channel attack countermeasures that may be used in the system 200 to further complicate the task of determining the node ranking on the part of the adversary node 124. The cost function that incorporates the side-channel attack countermeasures into the total-leakage cost function is: $c(T)=\Sigma_{(i,j)\in\tau}f(d_{i,j})$.

As described above, in some embodiments the group cryptographic key exchange process must transmit a larger number of bits between earlier pairs of nodes compared to later pairs of nodes since on average half of the bits that are transmitted between nodes are discarded. In one configuration, the system 200 optionally uses a cost scaling factor S to ensure that the minimum path identified above actually ranks nodes in the optimal order, and not in a reversed order that is suboptimal using a cost scaling factor based on the scale factor $S=2^{(H-h)}$ where H is the total number of "hops" or graph edge traversal operations that are required to cover all of the nodes in the group, where the number H=M−1, meaning that there is one less hop than the total number of M nodes in the group. The variable h represents the current hop starting from h=1 and incrementing up to H for each additional hop until the final hop at which point the scale factor S is equal to 1. The system 200 multiplies the scale factor S by the cost function values described above to effectively make earlier hops in the cost-minimization be exponentially more expensive than the later hops in the process. The system 200 uses the scaling factor S to compensate for the fact that the group cryptographic key exchange process transmits the largest number of bits at the beginning of the process in the first hop and then decreases the number of bits that are transmitted by half (on average) for each subsequent node pair (e.g. the group cryptographic key exchange process that transmits 2048 bits, 1024 bits, 512 bits, and 256 bits over four hops described above).

Figure 5:
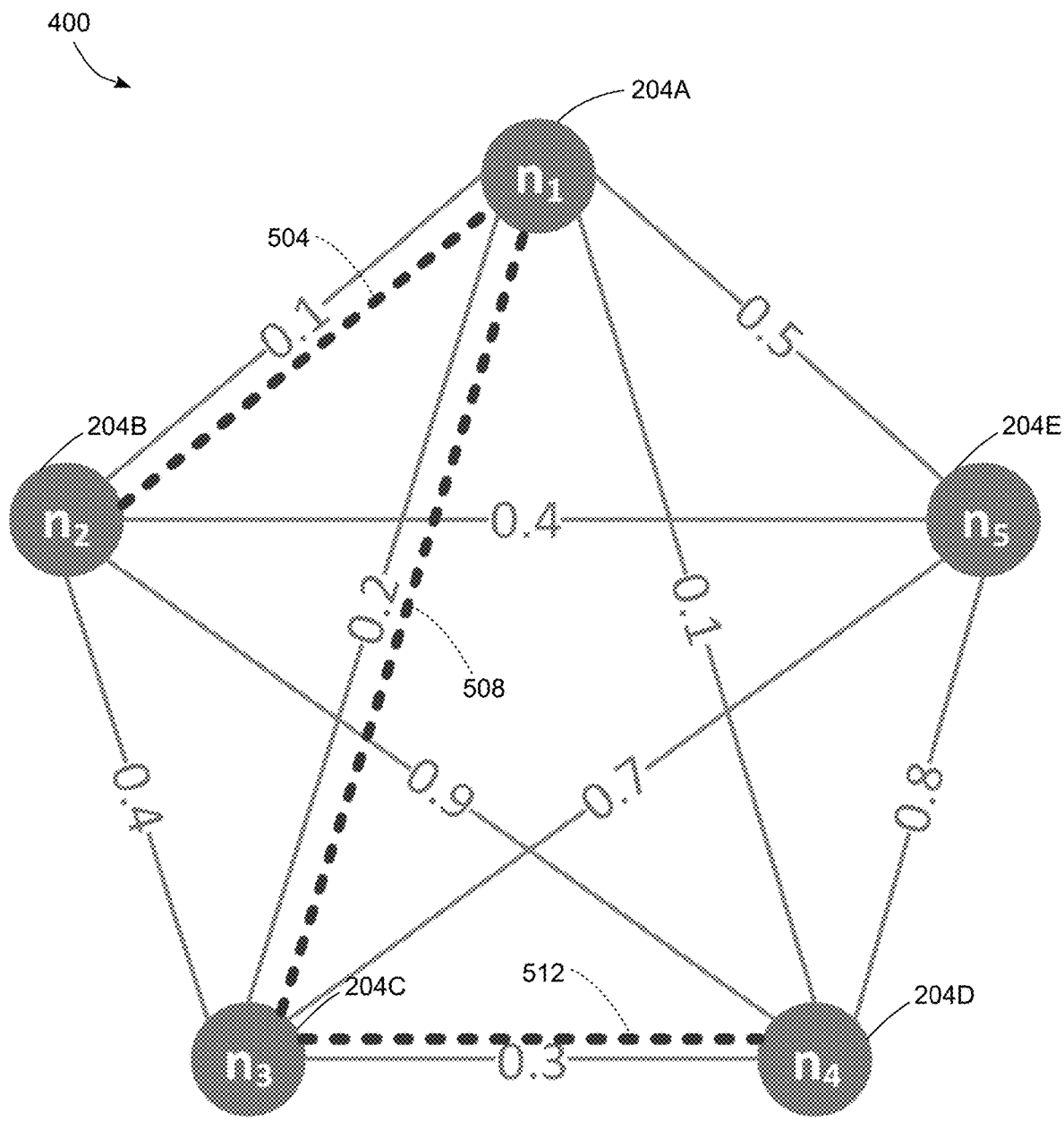
FIG. 5 is a graph depicting an order of operation of nodes to perform a group cryptographic key exchange operation that minimizes leakage based on the leakage graph of FIG. 4.

The scaling factor S ensures that the path optimization process incorporates the fact that earlier hops result in the transmission of more data bits than later hops into the path generation results. FIG. 5 provides a simple example of the usefulness of the scaling factor S. In FIG. 5 the graph 400 includes a minimal Hamiltonian path that includes weighted edges 504, 508, and 512 that provides a ranking of vertices and the corresponding nodes in the following order: $(n_2, n_1)$, $(n_1, n_3)$, and $(n_3, n_4)$. In particular, the lowest edge weight along the edge 504 is 0.1 and the largest edge weight along the final edge 512 is 0.3. Using a traditional cost function that considers the total cost of this path, the cost is simply: 0.1+0.2+0.3=0.6 for the edges 504, 508, and 512, respectively. However, without the scaling factor S, the prior art path minimization process could just as easily reverse the path described above and produce the following suboptimal ranking order: $(n_4, n_3)$, $(n_3, n_1)$, and $(n_2, n_1)$. Using the prior art path minimization process, the total path cost for the reversed path is exactly the same (0.6) as for traversing the path in the forward direction, but this produces suboptimal results in the system 200 because a much larger number of bits are being transmitted between nodes 204D and 204C with the higher leakage score 0.3 compared to ordering the path starting with the nodes 204B and 204A. The scaling factor S prevents this reversed path from being used by increasing the relative importance of the earliest hops in the path. For example, over the three-hop path depicted in FIG. 5 using the scaling factor S produces:

Optimal Path $(N2 \rightarrow N1 \rightarrow N3 \rightarrow N4):2^{(3-1)}(0.1)+2^{(2-1)}$
$(0.2)+2^{(2-2)}(0.3)=1.1$ (win)

Reversed Path $(N4 \rightarrow N3 \rightarrow N1 \rightarrow N2):2^{(3-1)}(0.3)+2^{(2-1)}$
$(0.2)+2^{(2-2)}(0.1)=1.7$ (lose)

Thus, the scaling factor S enables the system 200 to determine that the reversed path is suboptimal even though a traditional minimal path traversal process would treat both paths as being equal to each other. As described above, the system 200 uses the scaling factor S to find paths in the graph that actually minimize leakage while properly incorporating the fact that earlier node pairs in the group cryptographic key exchange process transmit substantially more bits than later pairs in the process. This is particularly useful as an optional modification in the embodiments, where to obtain information theoretic secrecy, the group utilizes the key agreement process, where bits are lost at each successive stage. Alternative embodiments can of course use a somewhat different scaling factor than the example of $S=2^{(H-h)}$ to achieve the same goal. In embodiments of the group cryptographic key exchange process that transmit equal or approximately equal numbers of bits between each pair of nodes, the scale factor operations may be omitted because the minimal leakage path can be traversed in either direction with effectively the same total level of leakage.

In the GroupKeyTree embodiment of the group cryptographic key exchange process, there is no requirement for the second node in each pair of the process to be used in the next pair. In the context of the leakage graph 400 and the node ranking process, this means that some vertices in the tree have more than one branch, which further means that a single node in the group can be paired with more than once with other nodes during the group cryptographic key exchange process if the pairing minimizes leakage. The same algorithms that are used above can be used to perform the ranking process for the GroupKeyTree embodiment as well. FIG. 6 depicts the graph 400 with a minimized leakage path with edges 604, 608, and 612 that connect vertex pairs (n1, n2), (n1, n4), and (n1, n3), respectively. Another ranking with the same total level of leakage would be (n1, n4), (n1, n2), and (n1, n3). The GroupKeyTree optionally uses the scaling factor described above or sorts the order of node pairs to rank the node pairs with minimum leakage cost values earlier in the ranking, which is feasible in the GroupKeyTree process because some vertices have multiple branches.

In the gateway node 250, the CAN controller 252 stores the ranking data that specifies the node order for key exchange data 264 in the memory 260. In some configurations, the system 200 generates and stores the ranking data 264 immediately prior to commencing a group cryptographic key exchange process, while in other embodiments the ranking data 264 are computed well in advance of the key exchange process.

Transmission of Ranking Data to Nodes in Group

The process 300 continues as the gateway node 250 transmits the node ranking data to the nodes in the group that perform the group cryptographic key exchange process so that the nodes actually perform the key exchange process in the order that is specified by the ranking (block 312). In one embodiment, the gateway node 250 transmits the ranking information through the CAN bus in plaintext. All of the nodes in the group (e.g. nodes 204A-204D in the example above) as well as all of the other nodes and the adversary 124 can receive the ranking information. While transmitting in plaintext is straightforward, the plaintext data transmission also reveals the ranking and order of transmission between nodes to the adversary node 124. As described above, a sophisticated adversary 124 that has specific decision functions $D_{i,j}$ to use in performing side-channel attacks on specific nodes can perform the attacks with higher effectiveness than an adversary that does not actually know which pair of nodes in the group is transmitting data at any one time. In one embodiment, the gateway node 250 uses a single shared key that is known to each node in the group (e.g. each of nodes 204A-204D) to transmit the node order data.

In another embodiment, the gateway node 250 uses a set of shared keys 266 that are stored in the memory 260 to send the node order information to each of the nodes in the group using encrypted messages. In the embodiment of FIG. 2, the gateway node 250 stores a different pre-shared key for each of the nodes 204A-204E. Each of the nodes 204A-204E also stores a single the key that is specific to that node, and each pre-shared key is only used for encrypted communications between the gateway node 250 and one of the nodes 204A-204E.

While the gateway node 250 can send an individual encrypted message to each node in the group to distribute the ranking information, in another embodiment sending a single message with subsets of encrypted data for each node consumes less bandwidth and enables the single message with the ranking information to serve as synchronization message that synchronizes all of the nodes that participate in the group key exchange process. The message is contained in one CAN bus data frame, or a predetermined number of data frames for larger groups, and the nodes can begin the group cryptographic key exchange process once the gateway 250 completes the ranking information transmission process. Using the example order of nodes from FIG. 5, the gateway node 250 transmits the ranking using a single message using the following format:

$$r\|f(k_{n2},r)\|f(k_{n1},r)\|f(k_{n3},r)\|f(k_{n4},r)$$

In the message above the "$\|$" operator refers to bit-concatenation. The term r is a randomly generated nonce that is used to ensure that the adversary node 124 cannot record the encrypted message and retransmit the same message to trigger a spurious group encryption key exchange process. The function $f$ is an encryption function (e.g. AES or another suitable cipher) and the terms $k_{n1}$-$k_{n4}$ are the individual cryptographic keys that are shared between the gateway node 250 and the nodes 204A-204D. Since the embodiment of FIG. 5 ranks the nodes using a Hamiltonian path in which each node is only used once, the ranking message only includes each node once. In the embodiment of FIG. 6 where a single node can potentially participate more than once in the group cryptographic key exchange process, the gateway 250 uses a slightly different message format in which the nonce value r is incremented by 1 for each additional occurrence of a given node in the ranking data. The following ranking message format is based on the node ranking of FIG. 6:

$$r\|f(k_{n1},r+0)\|f(k_{n2},r+0)\|f(k_{n1},r+1)\|f(k_{n3},r+0)\|f(k_{n1},r+2)\|f(k_{n4},r+0)$$

In the individual key encryption embodiment described above, the adversary node 124 is unable to determine the ranking order of the nodes based on the transmission of the ranking data from the gateway node 250. Additionally, the gateway node 250 encrypts the fields in the messages above using individual node keys that prevent even members of the group that are exchanging the shared encrypted key from being aware of the full transmission order. Furthermore, in some embodiments the gateway node 250 optionally computes a message authentication code (MAC) that is transmitted with the ranking to prevent modification of the encrypted ranking data by the adversary node 124.

Group Cryptographic Key Exchange Process

The process 300 continues as the nodes in the group perform the group cryptographic key exchange process in which the pairs of nodes transmit the cryptographic data in the order specified in the ranking message transmitted from the gateway node 250 (block 316). Using the example depicted in FIG. 5, the node pair 204B-204A exchanges the cryptographic data first, followed by the node pair 204A-204C, and finally 204C-204D, where the node 204B acts as the origin and each of the nodes 204A, 204C, and 204D acts as a link in a linear chain of node pairs to propagate the cryptographic key data to all of the nodes in the group. In the embodiment of FIG. 6, the nodes the node pair 204A-204B exchanges the cryptographic data first, followed by the node pair 204A-204D, and finally the node pair 204A-204C, where the node 204A participates in more than one cryptographic key exchange operation due to the low levels of leakage between this node and the nodes 204B, 204D, and 204C in the leakage graph.

The process 300 described above reduces the total amount of leakage to the adversary node by controlling the order of transmission between nodes in the group to reduce the total amount of leakage that the adversary node 124 can observe during a group cryptographic key exchange process. As noted above, the system 200 and the process 300 are also compatible with hardware and software techniques that reduce the overall level of leakage by obfuscating the data that are transmitted during the group cryptographic key exchange process to further reduce the ability of the adversary node 124 to identify the contents of the cryptographic key.

In the embodiments described above, the gateway node 250 never gains access to the shared cryptographic key that is exchanged between the nodes 204A-204E even though the gateway node 250 sets the ranking sequence that controls the sequence operation of the pairs of nodes 204A-204E. The gateway node 250 is described as operating separately from the remaining nodes 204A-204E for illustrative purposes, but in some embodiments the gateway node 250 is itself one of the nodes that participates in a group cryptographic key exchange process, and the group node 250 includes itself in the leakage graphs and assigns itself a ranking in the group cryptographic key exchange process in a similar manner to the other nodes 204A-204E in the system 200.

The embodiments described herein describe methods for reducing leakage to an adversary during group cryptographic key exchange operations in which nodes transmit data simultaneously using a shared communication medium such as CAN Bus. The embodiments also describe systems and methods that reduce or eliminate the effectiveness of these attacks. These embodiments protect against adversaries that can physically probe the voltage characteristics of communication medium using high resolution equipment. Examples of systems that can use these methods include, but are not limited to, automotive systems (cars, buses, trucks, farm equipment, trains), industrial systems that use CAN bus, control panels for DC-electrical power distribution systems, and security systems that use CAN bus. The embodiments described herein include methods to utilize the gateway node (master node) to estimate the leakage due to node interaction using pre-established knowledge of physical parameters of the system. Examples of parameters include wire length between nodes, node manufacturer, resistive, capacitive and inductive circuit elements. The embodiments described herein include methods to utilize the gateway node (master node) to estimate the leakage due to node interaction using physical modeling and learning based methods. Examples of these methods include deep learning methods such as Convolutional Neural Networks (CNN), Long-short term memory (LSTM), or classical machine learning techniques like support vector machines (SVM). The embodiments described herein include methods to optimize the node order to minimize overall leakage based on the leakage function estimated by the gateway node. Optimization criterion and solutions were defined for a linear version of the protocol. Examples of minimization criteria include total leakage minimization and minimization of maximum-link leakage. The embodiments described herein optimize the node order to minimize overall leakage for tree-based version of the protocol, based on the leakage function estimated by the gateway node. Examples include minimization criteria include total leakage minimization and minimization of maximum-link. The embodiments described herein include methods to communicate the node-order to the nodes in a privacy preserving manner by hiding the node order from an eavesdropper. Methods were proposed to utilize a common pre-shared group key to obfuscate the node order from an adversary, or utilizing a 'pairwise' pre-shared key between the master node and the protocol participants to hide the node order from an adversary.

It will be appreciated that variants of the above-disclosed and other features and functions, or alternatives thereof, may be desirably combined into many other different systems, applications or methods. Various presently unforeseen or unanticipated alternatives, modifications, variations or improvements may be subsequently made by those skilled in the art that are also intended to be encompassed by the following claims.

What is claimed:

1. A method for operation of a communication network comprising:
    generating a ranking to order operation of a plurality of nodes in the communication network that exchange data in a group cryptographic key exchange process based on a leakage map of the nodes, the ranking minimizing leakage of data through a shared communication medium during the group cryptographic key exchange process;
    transmitting, with a gateway node in the communication network, the ranking to the plurality of nodes through the shared communication medium; and
    performing, with the plurality of nodes, the group cryptographic key exchange process in an order of operation specified in the ranking to enable the plurality of nodes to exchange a shared cryptographic key through the shared communication medium while minimizing leakage of data through the shared communication medium,
    wherein the group cryptographic key exchange process includes a plurality of transmissions of data between pairs of nodes in the plurality of nodes according to the order of operation specified in the ranking, the group cryptographic key exchange process requiring a largest amount of transmissions of data between an earliest pair of nodes in the order of operation and an increasingly diminished amount of transmissions of data between each subsequent pair of nodes in the order of operation.

2. The method of claim 1 further comprising:
    training a classifier based on a plurality of observations generated by the gateway node of signals transmitted through the shared communication medium by the plurality of nodes;
    generating the leakage graph including a first vertex a second vertex connected by a weighted edge, the first vertex and the second vertex corresponding to a first node and a second node, respectively, in the plurality of nodes, the weighted edge being generated based on a probability of a decision function that uses the classifier successfully identifying that an observed signal is transmitted from one of the first node and the second node in the plurality of nodes, the leakage graph being generated prior to generating the ranking.

3. The method of claim 1 further comprising:
    generating the leakage graph, including a first vertex a second vertex connected by a weighted edge, the first vertex and the second vertex corresponding to a first node and a second node, respectively, in the plurality of nodes, the weighted edge being generated based at least in part upon a ratio of a length of the shared communication medium that separates the first node and the second node divided by a length of the shared communication medium, the leakage graph being generated prior to generating the ranking.

4. The method of claim 3, the weighted edge further being generated based at least in part upon a difference between architectures of a first transceiver in a first node and a second transceiver in the second node, a difference between operating voltage levels of a first operating voltage level in the first node and a second operating voltage level in the second node, and a difference between manufacturers of the first transceiver in the first node and a second transceiver in the second node.

5. The method of claim 1, the generating of the ranking further comprising:
    generating the ranking based on a path that connects a plurality of vertices in the leakage graph that correspond to the plurality of nodes, the path including each vertex exactly once.

6. The method of claim 1, the generating of the ranking further comprising:
    generating the ranking based on a path that connects a plurality of vertices in the leakage graph that correspond to the plurality of nodes, the path including each vertex at least once and at least one vertex more than once.

7. The method of claim 1, the transmitting of the ranking further comprising:
    generating, with the gateway node using at least one cryptographic key that is shared between the gateway node and the plurality of nodes, an encrypted ranking based on the ranking; and transmitting, with the gateway node, the encrypted ranking to the plurality of nodes through the shared communication medium to prevent leakage of the ranking through the shared medium.

8. The method of claim 1 wherein the shared communication medium is a Controller Area Network (CAN) bus.

* * * * *